Figure 1:
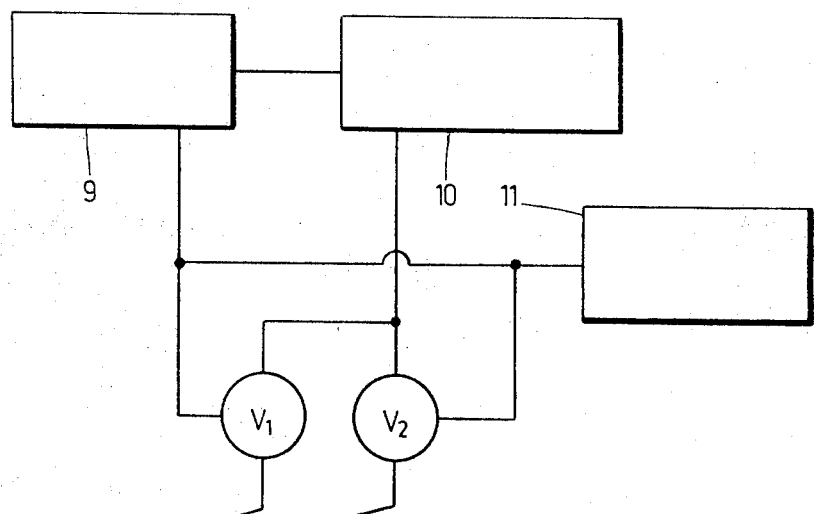

United States Patent [19]
Laurent et al.

[11] 3,770,080
[45] Nov. 6, 1973

[54] DEVICE FOR GENERATING ACOUSTIC WAVES BY IMPLOSION

[75] Inventors: Jean Laurent, Saint Germain-en-Laye; Pierre Magneville, Vernouillet, both of France

[73] Assignee: Institut Francais Du Petrole Des Carburants Et Lubrifiants, Rueil-Malmaison, (Hauts-de-Seine), France

[22] Filed: Sept. 20, 1971

[21] Appl. No.: 182,040

[30] Foreign Application Priority Data
Sept. 24, 1970 France .............................. 7034726

[52] U.S. Cl. .............................................. 181/.5 H
[51] Int. Cl. .............................................. G01v 1/02
[58] Field of Search ....................... 181/.5 H, .5 XL; 138/93

[56] References Cited
UNITED STATES PATENTS
3,483,895 12/1969 Barto .................................. 138/93
3,077,944 2/1963 Padberg ............................ 181/.5 H
3,277,437 10/1966 Bouyoucos ........................ 181/.5 H
3,610,366 10/1971 Gooldberg ........................ 181/.5 H

*Primary Examiner*—Benjamin A. Borchelt
*Assistant Examiner*—J. V. Doramus
*Attorney*—Craig & Antonelli

[57] ABSTRACT

Device for generating pressure waves in a liquid medium comprising a hollow cylinder closed at one end by a bottom and at the other hand by an inflatable membrane pressing against the inner cylinder wall in the position of closure of the cylinder and capable to collapse abruptly when deflated, thereby giving passage to the liquid medium. For operating the device a substantial vacuum is created in the cylinder when closed by the membrane in inflated position and, by controlling the gas pressure in the enclosure formed by the membrane, the latter is allowed to collapse abruptly, so that the subsequent abrupt rush of liquid in the cylinder generates sound waves.

12 Claims, 3 Drawing Figures

DEVICE FOR GENERATING ACOUSTIC WAVES BY IMPLOSION

This invention relates to a new device for generating sonic waves in a liquid medium, particularly useful in marine seismic prospecting.

As devices making use of the implosion phenomenon for generating sonic waves there can be mentioned, for example, that described in U.S. Pat. Spec. No. 3,369,627. This device is immersed and comprises essentially a cylindrical body provided, at one end thereof, with a first plate. A piston, slidably mounted in the cylindrical body, is actuated by a pneumatic system co-operating with a hydraulic system and drives therewith a second plate. The latter, during one operation step, is pressed against the first plate, while no force is exerted on the external face of the piston. When during another operation step, a high force is exerted quickly, by pressure, on the external face of the piston, the second plate is suddenly moved apart from the first plate, thereby producing a vacuum hole whereinto the surrounding water rushes by implosion and creates sonic waves.

The device according to this invention, while making use of the implosion phenomenon, is however different from the above-mentioned one. It comprises essentially a hollow body provided with walls against which a sealing member is pressed intermittently. In one of the operating steps, the inside of the hollow body is sealed off from the surrounding water and subjected to a pressure considerably lower than that prevailing outside.

In another operating step, at the moment selected for the shot, the sealing performed by the sealing member is abruptly discontinued and consequently the communication is established between the inside of the hollow body and the surrounding water body. The water abruptly rushes into said hollow body, thereby generating sonic waves by implosion.

The sealing element preferably consists of a flexible membrane providing for the sealing or discontinuing the same, in accordance with the deformation imparted thereto.

This device, as compared to the already known device, has the advantage of avoiding a quick wear of the parts. This is due both to the facts that no heavy metal part is driven in motion and that the sealing joints, subjected to quick translating motions, and accordingly liable to damage, are omitted. Moreover the opening, abruptly released at the moment selected for the shot, is large enough for preventing cavitation on the walls of the hollow body.

Furthermore, the power supplied to the system is entirely used for creating the shock wave, in contrast to the already known system in which a part of the supplied power is used for counterbalancing the hydostatic pressure as well as the friction generated by the abrupt displacement of one plate.

Figure 2:
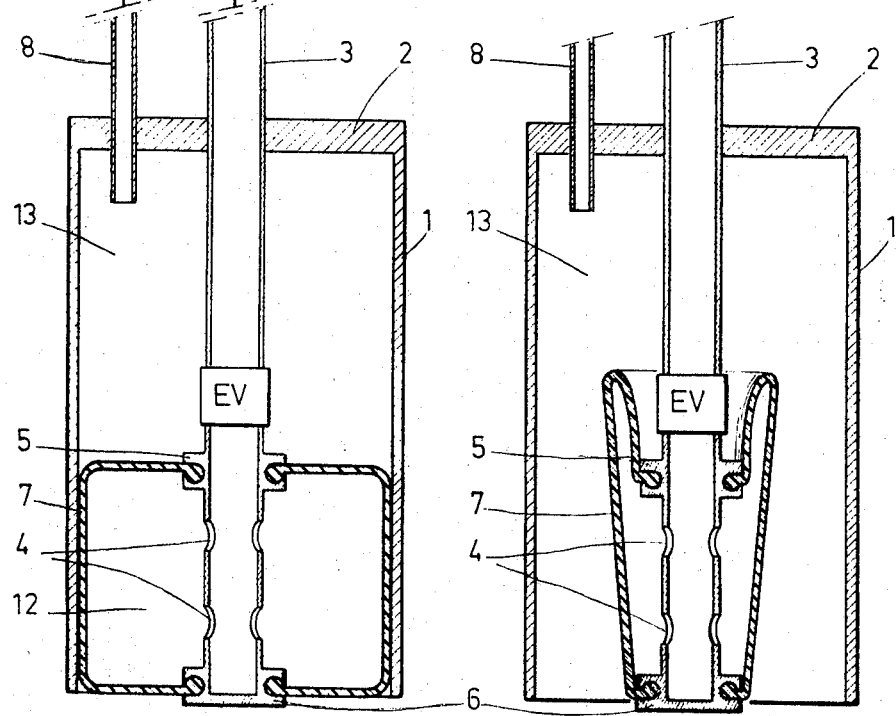
Figure 3:
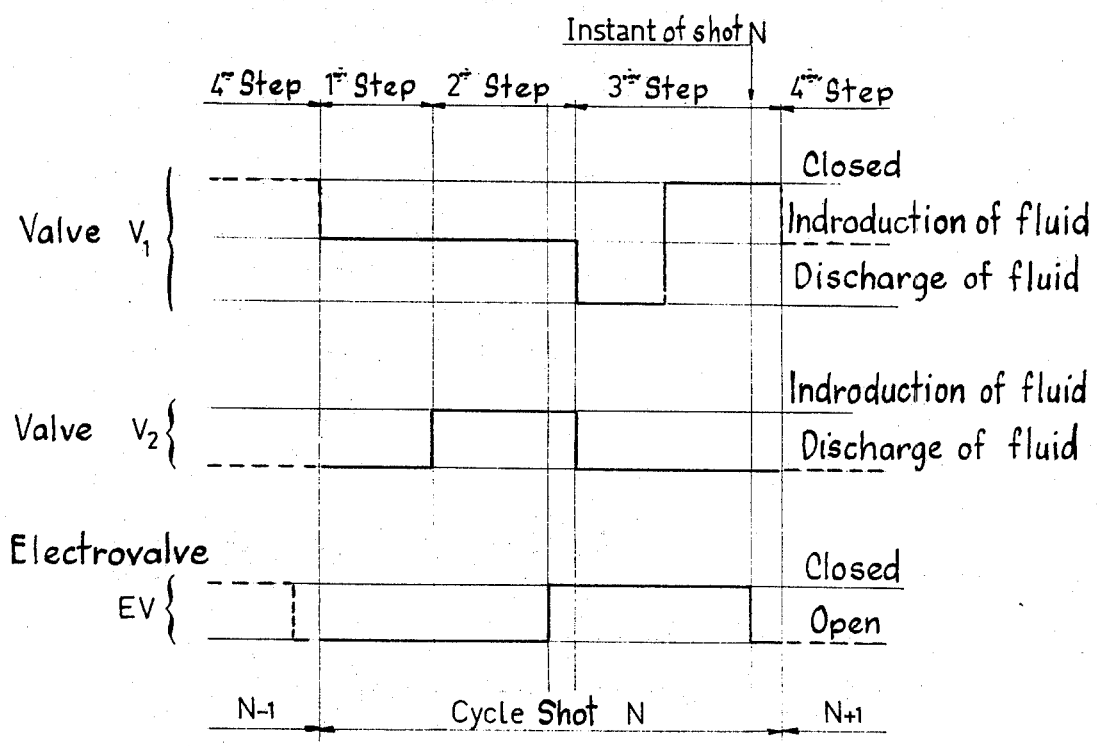

The invention will be further described more in detail with reference to the accompanying drawings wherein:

FIG. 1 diagrammatically shows a cross-sectional view of an embodiment of the device, with the membrane in sealing position;

FIG. 2 diagrammatically shows a cross-sectional view of the device, with the membrane in a non-sealing position;

FIG. 3 is an operation diagram of the device for a cycle of shot.

According to an embodiment of the device, illustrated by way of example, in FIG. 1, the latter comprises a hollow cylindrical body 1, closed at one end by a bottom 2. A tube 3, e.g., of metal, placed inside the cylindrical body 1 and longer than the latter, passes through the bottom 2.

It is provided with orifices 4 on a part of its length, in the direction of the open end of body 1. A sealing element consisting of a semi-annular flexible membrane 7 is tightly secured to the external wall of tube 3, at two different levels thereof, on both sides of the tube length provided with the orifices 4.

Another tube 8 passes through the bottom 2 of the cylindrical body and opens thereinto. It is connected, through a three-way valve $V_1$, on the one hand, to a compressed air outlet of a pneumatic station 9, through a compressed air tank 10, on the other hand to the suction part of station 9 to a vacuum capacity 11. The valve $V_1$ has also a closed position. The tube 3 is connected, through a valve $V_2$, on the one hand to the compressed air tank 10, and, on the other hand to the vacuum capacity 11. An electrovalve EV is placed on the tube 3, between the valve $V_2$ and the tube part associated to the membrane.

Elements 9, 10, 11, $V_1$ and $V_2$ are placed on the ship, while the assembly of the elements solid with the cylindrical body is immersed and connected to the ship, e.g., through a flexible tube, not shown, containing towing means as well as the tubes 3 and 8.

The operation of this device will be described with reference to FIGS. 1 and 2 showing the devcce at two different steps of operation, and to FIG. 3 illustrating a shot cycle N between a shot N−1 and a shot N+1.

In a first step, the membrane 7 being at rest, in a non-sealing position, the immersed cylindrical body 1 is filled with water. The membrane 7 being tightly secured to the tube 3, its internal space is insulated from the liquid medium.

The valve $V_1$ being in suitable position, compressed air is supplied to the inner space of the cylindrical body 1, through tube 8, at a pressure higher than the hydrostatic one. The water contained in body 1 is thus expelled.

In a second step, while water is expelled from the cylindrical body, the electrovalve EV is opened and compreseed air, delivered from valve $V_2$ and conveyed through tube 3, is fed to the enclosure 12, delimited by the membrane, through orifices 4. The enclosure inflates and comes in abutment against the inner wall of the cylindrical body 1 (FIG. 1), thus closing a space 13 delimited otherwise by the bottom 2 and the inner wall of body 1. When the pressure in the enclosure 12 is sufficient for insuring a good sealing, the electrovalve EV is closed. The space 13 is thus insulated from the liquid external medium.

In a third step, while valve $V_1$ communicates with the vacuum capacity 11, the air contained in space 13 is sucked through tube 8 until a substantial vacuum is achieved in said space. Simultaneously vacuum is also created in the part of tube 3 between the electrovalve EV and the valve $V_2$, the latter being also in a suction position.

The valve $V_1$ is then actuated to its closed position while the valve $V_2$ is still in suction position and electrovalve EV in closed position.

In a fourth step, at the time selected for the shot the electrovalve EV is opened. The air contained in the enclosure 12, delimited by the membrane 7, abruptly flows out through orifices 4 and the membrane 7 being flexible flattens itself against the tube 3, thereby uncovering a large annular passageway in the cylindrical body, wherein water rushes abruptly. There is thus generated, on the bottom 2 of the body 1, when the water mass strikes it, a compressional wave which is perfectly utilizable for seismic prospecting.

We claim:

1. A device for generating pressure waves in a liquid medium, comprising a hollow body immersed in the liquid medium for operation and having a wall and a closed bottom, means for introducing a fluid into the hollow body to remove the liquid medium from within the hollow body, a retractable sealing member associated with means for pressing the sealing member intermittently against the wall of the hollow body so as to effect a closure of the hollow body and seal the body from the surrounding liquid medium, and means for discharging the fluid introduced into the hollow body from a space inside the body between the bottom and the sealing member during the period when the sealing member effects the closure of the body, whereby upon retracting of the sealing member, the liquid medium surrounding the hollow body enters the hollow body for generating a pressure wave in the liquid medium.

2. A device according to claim 1, wherein the sealing member is a flexible membrane forming an inflatable enclosure.

3. A device according to claim 2, wherein the means for intermittently pressing the membrane against the wall of the hollow body consists of a tube, a part of which, provided with orifices, penetrates in said enclosure, associated with means for compression and suction of the fluid contained in said enclosure.

4. A device according to claim 3, wherein said fluid is air.

5. A device according to claim 1, wherein the means for introducing fluid and the means for discharging fluid from the space includes a tube opening in said space and associated with means for compression and suction of said fluid.

6. A device according to claim 5, wherein said fluid is air.

7. A device for generating pressure waves in a liquid medium, comprising a hollow body immersed in the liquid medium for operation, said hollow body having a closed bottom end portion, a wall portion extending therefrom and an open end portion open toward the liquid medium, a retractable sealing member arranged proximate to the open end portion for alternately closing and opening the open end portion, means for controlling said sealing member for intermittently pressing the sealing member against the wall portion of the body for closing the open end portion to seal the hollow body from the surrounding liquid medium; and means for establishing in the hollow body when closed by the sealing member a pressure which is substantially lower than that of the liquid medium surrounding the immersed body, whereby upon retracting of the sealing member, the surrounding liquid medium rushes into hollow body for impacting on the closed bottom end portion to generate a pressure wave in the liquid medium.

8. A device according to claim 7, wherein the sealing member is a flexible membrane forming an inflatable enclosure.

9. A device according to claim 8, wherein the means for intermittently pressing the membrane against the wall of the hollow body consists of a tube, a part of which is provided with orifices penetrating in said enclosure, associated with means for inflating and abruptly deflating the membrane through said tube.

10. A device according to claim 9, wherein the means for inflating and deflating the membrane is a pneumatic system.

11. A device according to claim 7, wherein the means for establishing a pressure substantially lower than that of the liquid medium consists of means for discharging a fluid into the hollow body for removing from the body the liquid medium and for sucking the fluid out of the hollow body when the sealing member closes the open end portion thereof.

12. A device according to claim 11, wherein the means for discharging and sucking the fluid is a pneumatic circuit associated with a tube opening in said hollow body.

* * * * *